E. G. CONNELLY.
Churn Dasher.
No. 56,374.
Patented July 17, 1866.
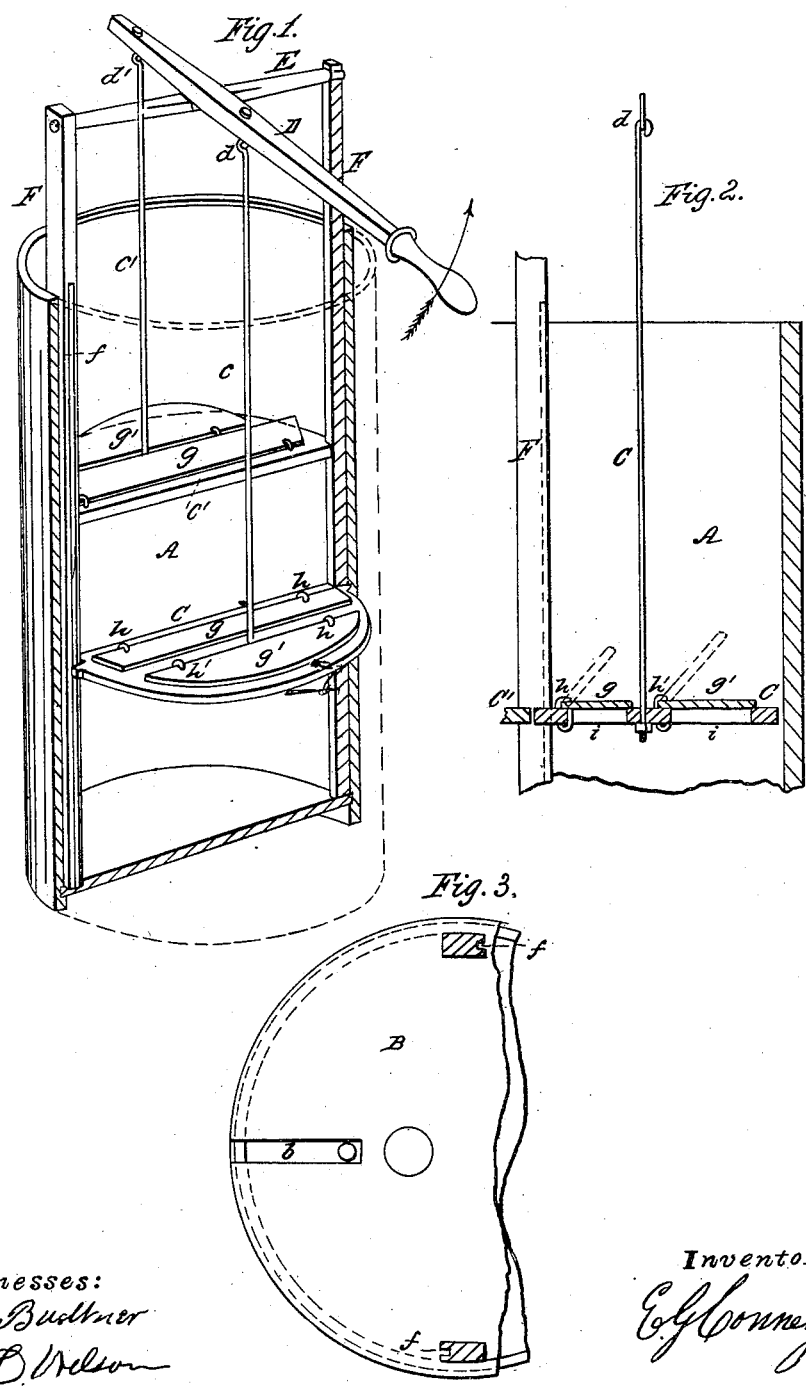
Witnesses:
Bruno Buchner
Simeon D. Nelson
Inventor:
E. G. Connelly

UNITED STATES PATENT OFFICE.

E. G. CONNELLY, OF JASPER, INDIANA.

IMPROVEMENT IN CHURN-DASHERS.

Specification forming part of Letters Patent No. 56,374, dated July 17, 1866.

*To all whom it may concern:*

Be it known that I, E. G. CONNELLY, of Jasper, in the county of Duboise and State of of Indiana, have invented a new, useful, and Improved Churn-Dasher; and I do declare that the following is a full, clear, and exact description of the construction and operation of the same, reference being had to the annexed drawings, making a part of this specification, in which—

Figure 1 is a perspective view of the churn with the dashers attached; Fig. 2, a transverse section of the churn and dashers; Fig. 3, a perspective view of the lid detached from the churn.

Letter A represents the churn; B, the lid; C and C', the dashers; D, the lever; E, the fulcrum; F F, the uprights which support the fulcrum.

$b$ represents the slot in the lid of the churn; $c$ and $c'$, the rods attaching the dasher C and C' to the lever D; $d$ and $d'$, the hooks and eyes attaching the rods $c$ and $c'$ to the lever D; $ff$, the grooves formed in the uprights F F; $g$ and $g'$, the valves formed in the dasher C and C'; $h$ and $h'$, the hinges attaching the valves to the dasher C and C', (shown in Fig. 1;) $i$ and $i'$, the open space in the dashers when the valves $g$ and $g'$ are open, as shown in Fig. 2.

The nature of my invention consists in the construction of a double dasher in such a manner as to obviate the necessity of constructing a churn to suit the dasher; but the dashers are so constructed as to suit all ordinary churns in general use.

The first feature of my invention consists, in the construction of the double dashers C C', (shown in Fig. 1,) in constructing the valves $g$ and $g'$, attached to the dasher C and C' by the hinges $h$ and $h'$, in such a manner that said valves $g$ and $g'$ open and close as they come in contact with the cream in the churn, the rods $c$ and $c'$ being firmly attached to the dasher C and C', and also attached to the lever D by the hooks and eyes $d$ and $d'$, forming a hinge or joint, allowing the dashers to pass down and up by the action of the lever D, (shown in Fig. 1;) and as said dasher C' is passed down by the action of the lever D and comes in contact with the cream in the churn A (shown in Fig. 1) the valves $g$ and $g'$ are opened, allowing the cream to pass through the open space in said dasher C, and thus preventing the cream from splashing to the top of the churn, the dasher C being elevated at the same time by the action of the lever D; and as the pressure of the cream comes in contact with the dasher C the valves $g$ and $g'$ are closed, as shown in Fig. 1, and as said dasher is elevated it is thrown in an inclined position, causing the cream to flow toward the center of the churn, causing a continued agitation of the cream until the particles of butter unite.

It will be observed that as the dashers are passed down or up by the action of the lever D, as shown in Fig. 1, the valves $g$ and $g'$ open and close in coming in contact with the cream in the churn.

A single dasher can be used, if preferred, by attaching the fulcrum to one side of the churn and only using one rod attached to the end of the lever with a hinge or joint, and using the same kind of valves as used in the double dasher.

The second feature of my invention consists in the formation of the grooves $ff$ in the uprights F F, (shown in Fig. 1,) allowing the atmosphere to regulate the temperature of the cream.

The slot $b$, formed in the lid of the churn, (shown in Fig. 3,) is designed to allow the rods $c$ and $c'$ to pass through said slot back and forth by the action of the lever D.

Having fully described the nature of my invention, therefore what I claim as new, and desire to be secured by Letters Patent, is—

The construction of the dasher C and C', with the valves $g$ and $g'$, with either a double or single dasher, operating in the manner and for the purpose substantially as set forth in the above specification.

E. G. CONNELLY.

Witnesses:
BREMO BUETTNER,
JOHN OPEL.